J. T. ALLMAND.
DRIP TROUGH FOR AUTOMOBILES.
APPLICATION FILED APR. 12, 1918.

1,307,801.

Patented June 24, 1919.

INVENTOR
John T Allmand
BY
ATTORNEY

UNITED STATES PATENT OFFICE.

JOHN T. ALLMAND, OF DETROIT, MICHIGAN, ASSIGNOR TO FISHER BODY CORPORATION, OF DETROIT, MICHIGAN, A CORPORATION OF NEW YORK.

DRIP-TROUGH FOR AUTOMOBILES.

1,307,801.  Specification of Letters Patent.  Patented June 24, 1919.

Application filed April 12, 1918. Serial No. 228,240.

*To all whom it may concern:*

Be it known that I, JOHN T. ALLMAND, a citizen of the United States, residing at Detroit, in the county of Wayne and State of Michigan, have invented a new and useful Improvement in Drip-Troughs for Automobiles, of which the following is a specification.

This invention relates to drip troughs for automobile closed bodies. It has been the practice heretofore to form these troughs out of strips of wood and nail them to the top of the body. Troughs have also been formed of aluminum which has been squirted into suitable dies to get the required and desired shape.

The object of this invention is to provide a suitable trough that can be made on drawing dies from a skelp. Its purpose is to secure all the advantages of an aluminum strip made in the way described and much cheaper and stronger.

In the drawings,—

Figure 1:
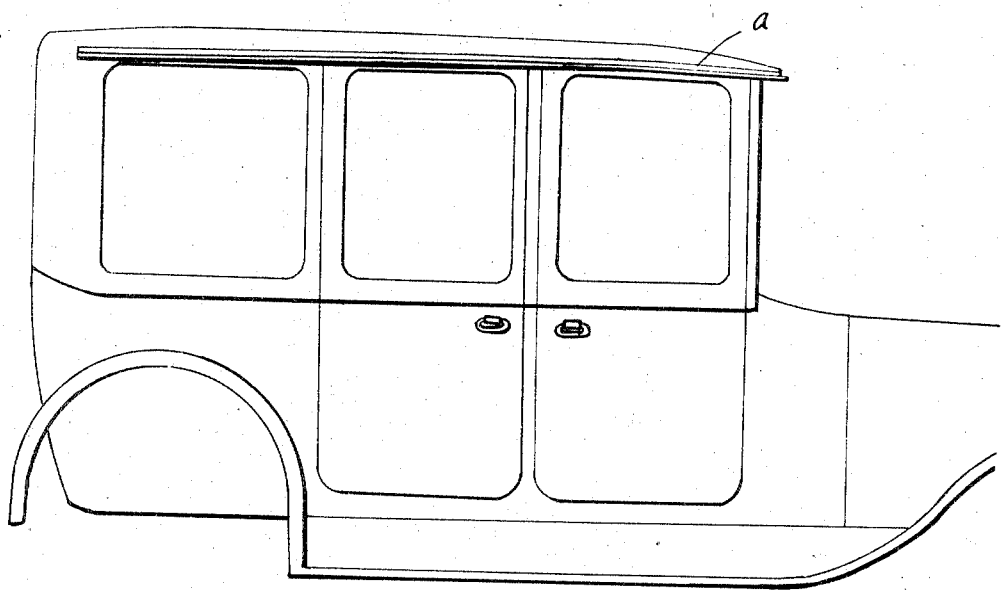
Figure 1 is a side elevation of a closed automobile body.

A drip trough in closed automobile bodies is now generally used at the two sides and front to prevent objectionable dripping of the water from the top of an automobile at places where it will interfere with the comfort of the persons using the car or will drive into the car windows. Such a trough is shown in Fig. 1 and designated *a*.

Figure 2:
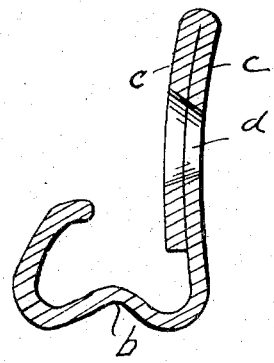
Fig. 2 is a cross section of the improved drip trough.

In Fig. 2 the configuration of the trough will be apparent. It is made of heavy steel stock such as used in windshield tubing, which is strong and not easily liable to be dented when subjected to an accidental blow. Such stock is not to be confused with the ordinary sheet metal used with eave troughs, which is easily bent into the required shape but which is so easily dented to be wholly out of the question for use as a drip trough for automobile bodies.

A steel strip such as used in windshield strips is used and will be termed a skelp, which is a name often used to designate the stock out of which tubing is made. This skelp is passed through suitable dies or dies and rollers to gradually draw it and gather it into the shape shown in Fig. 2. The one side of the skelp is bent into a trough with a corrugation *b* in its bottom, while the other side of the trough forms a vertical webbing which is two or three times as high as the trough itself and which is folded upon itself as shown at *c, c* for the purpose of giving strength to the web and more especially for giving a suitable thickness which will allow the screw hole *d* to have the proper depth of countersinking to take the ordinary screw head. The shape of the trough is in cross section roughly an L. This allows the screw head to have its outer surface flush or even sunk beneath the outer surface of the web so that when the painting job is done on the car the screws will be practically covered up and invisible.

The upwardly projecting corrugation in the bottom of the trough not only makes a better looking trough but it is obviously stronger. It also tends to break the continuity of the bottom in such a way as to prevent the water in the trough slopping over by momentum secured in the periodic vibration of the swinging of the car.

What I claim is:

1. A drip trough for automobiles, comprising a skelp of relatively heavy metal formed at one side into a trough with a corrugated bottom, the corrugation running longitudinally of the trough and at the opposite side formed into a strip doubled upon itself which can be attached to the side of an automobile to form a hanger for the trough.

2. A drip trough, comprising a heavy metal skelp formed into a trough portion and a hanger portion, the hanger portion being formed by one side of the trough continued up above the trough and doubled back upon itself to give thickness for countersinking screw heads.

In witness whereof I have hereunto set my hand on the 10th day of April, 1918.

JOHN T. ALLMAND.